(12) United States Patent
Morgenbrod et al.

(10) Patent No.: US 9,140,966 B2
(45) Date of Patent: Sep. 22, 2015

(54) PROJECTION DEVICE AND METHOD FOR OPERATING A PROJECTION DEVICE

(75) Inventors: Nico Morgenbrod, Berlin (DE); Henning Rehn, Berlin (DE)

(73) Assignee: OSRAM GmbH, Munich (DE)

( * ) Notice: Subject to any disclaimer, the term of this patent is extended or adjusted under 35 U.S.C. 154(b) by 278 days.

(21) Appl. No.: 13/818,914

(22) PCT Filed: Aug. 1, 2011

(86) PCT No.: PCT/EP2011/063242
§ 371 (c)(1),
(2), (4) Date: Feb. 25, 2013

(87) PCT Pub. No.: WO2012/025339
PCT Pub. Date: Mar. 1, 2012

(65) Prior Publication Data
US 2013/0155379 A1   Jun. 20, 2013

(30) Foreign Application Priority Data
Aug. 24, 2010  (DE) .......................... 10 2010 039 683

(51) Int. Cl.
| | |
|---|---|
| G03B 21/14 | (2006.01) |
| G02B 27/09 | (2006.01) |
| G03B 21/20 | (2006.01) |
| F21V 8/00 | (2006.01) |
| F21V 21/28 | (2006.01) |
| F21W 131/205 | (2006.01) |
| F21Y 101/02 | (2006.01) |

(52) U.S. Cl.
CPC ............ *G03B 21/14* (2013.01); *G02B 27/0994* (2013.01); *G03B 21/145* (2013.01); *G03B 21/204* (2013.01); *G03B 21/2046* (2013.01); *G03B 21/2066* (2013.01); *F21V 21/28* (2013.01); *F21W 2131/205* (2013.01); *F21Y 2101/02* (2013.01); *F21Y 2101/025* (2013.01); *G02B 6/0003* (2013.01)

(58) Field of Classification Search
CPC .. G03B 21/14; G03B 21/204; G03B 21/2046; G03B 21/2066; F21V 2101/02; F21V 21/28; G02B 27/0994; G02B 6/0003; G02B 21/145; F21Y 2101/02; F21W 2131/205
See application file for complete search history.

(56) References Cited

U.S. PATENT DOCUMENTS

| | | | | |
|---|---|---|---|---|
| 5,278,596 | A * | 1/1994 | Machtig | 353/122 |
| 5,710,663 | A * | 1/1998 | Kawasaki | 359/389 |
| 6,179,426 | B1 * | 1/2001 | Rodriguez et al. | 353/69 |
| 6,212,213 | B1 | 4/2001 | Weber et al. | |
| 7,186,005 | B2 | 3/2007 | Hulse | |
| 7,281,807 | B2 * | 10/2007 | Plut | 353/119 |

(Continued)

FOREIGN PATENT DOCUMENTS

| | | |
|---|---|---|
| CN | 1786766 | 6/2006 |
| CN | 201097088 | 8/2008 |

(Continued)

*Primary Examiner* — Bao Q Truong
(74) *Attorney, Agent, or Firm* — Cozen O'Connor

(57) ABSTRACT

A projection device (1; 24), comprising a base (2), a support (3) and a projection head (4; 27), the support (3) being rotatable relative to the base (2) and relative to the projection head (4; 27) wherein a light guide system (10-18) is accommodated in the support, (3) and at least one wavelength-converting luminophore (22) for converting at least part of a light beam (L) generated by the at least one light source (5) is accommodated in the projection head (4; 27).

13 Claims, 2 Drawing Sheets

(56) References Cited

U.S. PATENT DOCUMENTS

| | | | |
|---|---|---|---|
| 7,465,067 B2 * | 12/2008 | Maes et al. | 362/275 |
| 2001/0046035 A1 | 11/2001 | Vanderwerf et al. | |
| 2002/0122260 A1 | 9/2002 | Okazaki | |
| 2007/0097501 A1 * | 5/2007 | Stern et al. | 359/453 |
| 2008/0079910 A1 | 4/2008 | Rutherford | |
| 2009/0034284 A1 | 2/2009 | Li et al. | |
| 2010/0202129 A1 | 8/2010 | Abu-Ageel | |

FOREIGN PATENT DOCUMENTS

| | | |
|---|---|---|
| CN | 101365985 | 2/2009 |
| CN | 101738737 | 6/2010 |
| DE | 30 46 663 | 7/1982 |
| DE | 103 04 199 | 8/2004 |
| DE | 10 2007 037 875 | 2/2009 |
| DE | 10 2007 055 480 | 8/2009 |
| EP | 1 887 404 | 2/2008 |

* cited by examiner

PROJECTION DEVICE AND METHOD FOR OPERATING A PROJECTION DEVICE

RELATED APPLICATIONS

This is a U.S. National Phase Application under 35 USC 371 of International Application PCT/EP2011/063242 filed on Aug. 1, 2011.

This application claims the priority of German application no. 10 2010 039 683.4 filed Aug. 24, 2010, the entire content of which is hereby incorporated by reference.

FIELD OF THE INVENTION

The invention relates to a projection device comprising a base, a support and a projection head, wherein the projection device comprises a wavelength-converting luminophore for converting a light beam generated by a light source. The invention also relates to a method for operating a projection device.

BACKGROUND OF THE INVENTION

Projection devices or beamers of the aforementioned type with a compact housing are known in which a light production unit creates mixed light by means of the luminophore. The mixed light is emitted via a frontally arranged projection optical system as a defined light beam. The frontally emitted light beam can be at least coarsely oriented by the adjustment of stand legs.

SUMMARY OF THE INVENTION

It is an object of the present invention at least partially to overcome the disadvantages of the prior art and, in particular, to provide a simply configurable and orientable projection device.

The object is achieved in accordance with one aspect of the invention directed to a projection device comprising a base, a support and a projection head, wherein the support can be rotated with respect to both the base and the projection head, wherein a light guide system is accommodated in the support and the projection head houses at least one wavelength-converting luminophore for converting at least a part of a light beam generated by the at least one light source.

The base can be configured, in particular, for fastening and/or arrangement of the projection device and can be designed as a (stand) foot for placement on a support, as a wall mounting, as a ceiling mounting, etc.

The support can be configured, in particular, as an arm or pivot arm.

By means of the projection head, light generated by the projection device can be emitted directed outwardly.

In the projection device, there is therefore at least one optical path which leads, by means of the light guide system of the carrier, to at least one luminophore in the projection head and further outwardly and/or to a light outlet opening in the projection head. Further optical paths can be present within the projection device. Light can therefore be fed at least into the support and further, from the support, into the projection head.

The optical path can begin in the base if the light is generated in the base or is fed into the base from outside. Alternatively, light infeed can take place directly into the support, for example, from an external primary light generation unit. The support can comprise, in particular, a light interface that is accessible from outside.

Whilst only the (original) light emitted by the at least one light source emerges from the support into the projection head, as a result of the wavelength conversion brought about by the luminophore, pure wavelength-converted light or mixed light made up from the original light and from wavelength-converted light can emerge from the projection head. Thus mixed light with a well defined overall color location, for example, white light, can be generated.

Said projection device has the advantage that light guidance to the projection head can be simply and economically configured, since in the simplest case, only a monochromatic light beam has to be guided. Orientation of the projection head in a wide spatial region is also easily achievable, due to the fastening of the support, which is rotatable on both sides.

Preferably, the at least one light source comprises at least one light-emitting diode. The light radiated by the at least one light source can be visible light, infrared light (IR-LED) or ultraviolet light (UV-LED). The at least one light-emitting diode can be present in the form of at least one individually housed light-emitting diode or in the form of at least one LED chip. A plurality of LED chips can be mounted on a common substrate ("submount"). The at least one light-emitting diode can be equipped with at least one suitable and/or common optical system for beam guidance, for example, a Fresnel lens, a collimator or the like. In place of, or in addition to inorganic light-emitting diodes, for example, based on InGaN or AlInGaP, in general, organic LEDs (OLEDs, for example, polymer OLEDs) can be used. Alternatively, the at least one light source can comprise, for example, the least one diode laser or other laser. The laser is preferably a semiconductor laser.

In one embodiment, at least one light source and/or a control apparatus (e.g. a driver for the at least one light source) is arranged in the base. The light source and the control apparatus can be grouped together in a primary light generating unit which is then arranged in the base. By this means, a particularly compact projection device is provided which, in particular, can be operated independently and in stand-alone operation.

Alternatively, the at least one light source and/or the control apparatus (e.g. grouped together to a primary light generating device) can be arranged remotely from the base and connected, for example, by means of a light guide, particularly an optical waveguide, to the projection device, in particular to the base thereof. This arrangement may be advantageous, for example, for operating lamps for medical applications, since in this way, interfering radiation generated by operation of the light source and/or of the control apparatus can be kept away by a remote arrangement of the primary light generating unit outside an operating theater. The primary light generating unit in automobile applications can also be arranged, for example, in a luggage space or engine compartment remote from a vehicle headlamp, or the like.

The primary light generating unit can also be provided and arranged for connection to a plurality of projection devices.

In a further embodiment, the support is rotatable relative to the base in a first plane and also relative to the projection head in a plane perpendicular thereto. By this means, the projection head can be oriented in any desired spatial angle. The rotation ability can be achieved, for example, through the use of an open rotation joint in each case.

In a further embodiment, the light guide system comprises at least one mirror in the support.

In a development, the light guide system comprises at least one beam-shaping optical element in the support, in particular at least one lens.

In a further embodiment, the light guide system comprises at least one optical waveguide in the support. In particular, the light guide system in the support can comprise precisely one optical waveguide which extends between an optical interface or transition, for example, to the base and an optical interface or transition to the projection head. By this means, a light guide system is made possible which is particularly simple to implement and is also robust.

In a further embodiment, the projection head has at least one dichroic mirror which directs at least part of the light from the support incident in the projection head to the at least one wavelength-converting luminophore, wherein the at least one dichroic mirror is transparent to the light which is wavelength-converted by the luminophore.

Therefore, by simple means, at least part of the original light can be directed onto the luminophore and the wavelength-converted light can be emitted again or decoupled with only small losses.

In a further embodiment, the projection head comprises at least one micromirror which directs at least part of the light falling from the support into the projection head onto the at least one wavelength-converting luminophore, the micromirror being arranged in a wavelength-converted light beam radiated back from the associated luminophore. This arrangement has the advantage that the light loss is very small. A proportion of the original light provided for a wavelength-conversion by the pre-determined luminophore can therefore be (strongly) focused onto the micromirror, for example, by means of a corresponding upstream lens. The micromirror can, in particular, broaden and deflect the light beam falling thereon onto the luminophore. The luminophore absorbs the original light and initially at least partially emits a wavelength-converted light. The wavelength-converted light is bundled into a light beam which has a significantly larger beam cross-section than a surface of the micromirror projected in the beam direction. The beam cross-section of the wavelength-converting light beam, at least at the location of the micromirror, can be at least 5 times, particularly at least 10 times, particularly at least 20 times, greater than the area of the micromirror projected in the beam direction.

In a further embodiment, a pre-determined proportion of the (original) light fed into the projection head is not directed to the at least one luminophore, but is emitted directly, and unconverted, out of the projection head or out of the light outlet aperture thereof. By this means, a spectral component of the original light emitted from the projection head can be adjusted with a high degree of accuracy and, consequently also, an overall color location of the mixed light generated from the original light and the wavelength-converted light. For example, the light source can emit blue light and the luminophore can convert blue light into yellow light, so that a white mixed light composed of blue and yellow spectral components is emitted from the projection head.

In a further embodiment, a plurality of wavelength-converting luminophores which convert incident light into light of a respective different wavelength is accommodated in the projection head. In this way, a particularly large color space (gamut) can be covered.

For example, an originally blue light beam can remain partially unchanged, partially converted by a blue/red converting luminophore into red light (for example, by means of a dichroic mirror deflecting blue light and allowing red light through, or a suitably arranged micromirror) and partially converted by a blue/green-converting luminophore into green light (for example, by means of a blue light-deflecting and green light-transmitting dichroic mirror or a suitably arranged micromirror). In this way, a mixed light can be generated within the RGB color space.

In a further embodiment, a plurality of wavelength-converting luminophores is accommodated in the projection head and only wavelength-converted light can be emitted from the head. In this way, for example, a UV light source can also be used. The UV light emitted from the UV light source can be converted into visible light, for example, by means of suitable luminophores, for example, into blue and yellow light or into red, blue and green light.

In a further embodiment, a light guide rod is arranged in front of at least one luminophore. The light guide rod can serve as a collimator for generating an essentially parallel beam shape along the longitudinal axis thereof, so that light which is emitted, initially non-aligned, from the luminophore or luminophore volume becomes aligned. By this means, light from the projection head can be emitted in a well defined ray beam. The light guide rod can also serve as a light mixing rod.

The light guide rod can be arranged, for example, between a dichroic mirror or a micromirror, on one side, and the luminophore irradiated thereby, on the other side.

In a further embodiment, the at least one luminophore is mounted at an end face of the light guide rod. By this means, particularly effective light coupling from the luminophore into the light guide rod can be achieved. The original light can be fed in and the wavelength-converted light can be emitted at the other cover face or end face of the light guide rod.

In a development, the luminophores are arranged at a rotating disk. Thus, the mixed light can be generated by a rotation of the disk at a pre-determined rotary speed and, depending on the spectral component, with sectors of different lengths laden with different luminophores. In a development, the luminophores are arranged on a strip or the like, capable of linear movement. Thus the mixed light can be generated by displacement of the strip at a pre-determined cycle rate and, depending on the spectral component, can also be generated with sectors having different lengths and different luminophores. The original light can be radiated back by the disk or strip (reflecting mode) or can pass through the disk or the strip (transmitting mode). For example, in reflecting mode, a spectral component of the original light can be mixed in by means of a reflecting sector and, in transmitting mode, by means of a transparent sector.

The projection device can be, for example, a lamp for room illumination. The projection device can also be used as a beamer. The projection device can also be provided for use in the "entertainment sector", for example, as a "moving head" spotlight. The projection device can also be used as an automobile headlamp, in particular for or as an AFL (Adaptive Forward Lighting) system/AFS (Adaptive Forwardlighting System). The projection device can also be used as an operating light. However, the invention is not restricted to the named uses and areas of use.

In general, although particularly also in a use as a moving-head spotlight or automobile headlamp, the projection device can be adjustable by a motor. In particular, for this purpose, the joints between the base and the support and/or between the support and the projection head can be coupled to suitable actuating motors. The support can be configured in a plurality of parts with joints, particularly movable by motors, between the parts.

Another aspect of the invention is directed to a method for operating a projection device, wherein the method comprises at least the following steps:
　　feeding light into a support which is rotatably connected to a base;

conducting the light through the support;
transmitting the light fed into the support to a projection head which is rotatably connected to the support;
conversion, in the projection head, of at least part of the light transmitted into the projection head into at least one wavelength-converted light, and
output of at least the wavelength-converted light from the projection head.

The output of at least the wavelength-converted light from the projection head can comprise output of only the wavelength-converted light, for example, if the light fed in is UV light. The light output or emitted from the projection head can be, in particular, a mixed light.

The output of at least the wavelength-converted light from the projection head can comprise output of wavelength-converted light and a portion of the light not directed to a luminophore, for example, if the light fed in is blue light. The light emitted from the projection head can be, in particular, a mixed light.

The output of at least the wavelength-converted light can comprise output of light of one wavelength (corresponding, for example, to a conversion at a luminophore) or light of a plurality of wavelengths (corresponding, for example, to conversion at a plurality of luminophores).

In one embodiment, the method comprises at least the following steps:
generating light in the base of the projection device;
transmitting the light generated in the base to the support rotatably connected to the base;
passing the light through the support;
transmitting the light conducted in the support to a projection head rotatably connected to the support;
conversion, in the projection head, of at least part of the light transmitted into the projection head into at least one wavelength-converted light, and
output of at least the wavelength-converted light from the projection head.

In a further embodiment, the conversion step comprises the following steps:
irradiation, with at least part of the light transmitted into the projection head, of at least one dichroic mirror or micromirror, the mirror deflecting the light fed in to at least one luminophore, and
generation of wavelength-converted light by means of the at least one luminophore.

BRIEF DESCRIPTION OF THE DRAWINGS

For the sake of clarity, the same or similarly acting elements are identified with the same reference signs In the drawings.

DETAILED DESCRIPTION OF THE DRAWINGS

Figure 1:
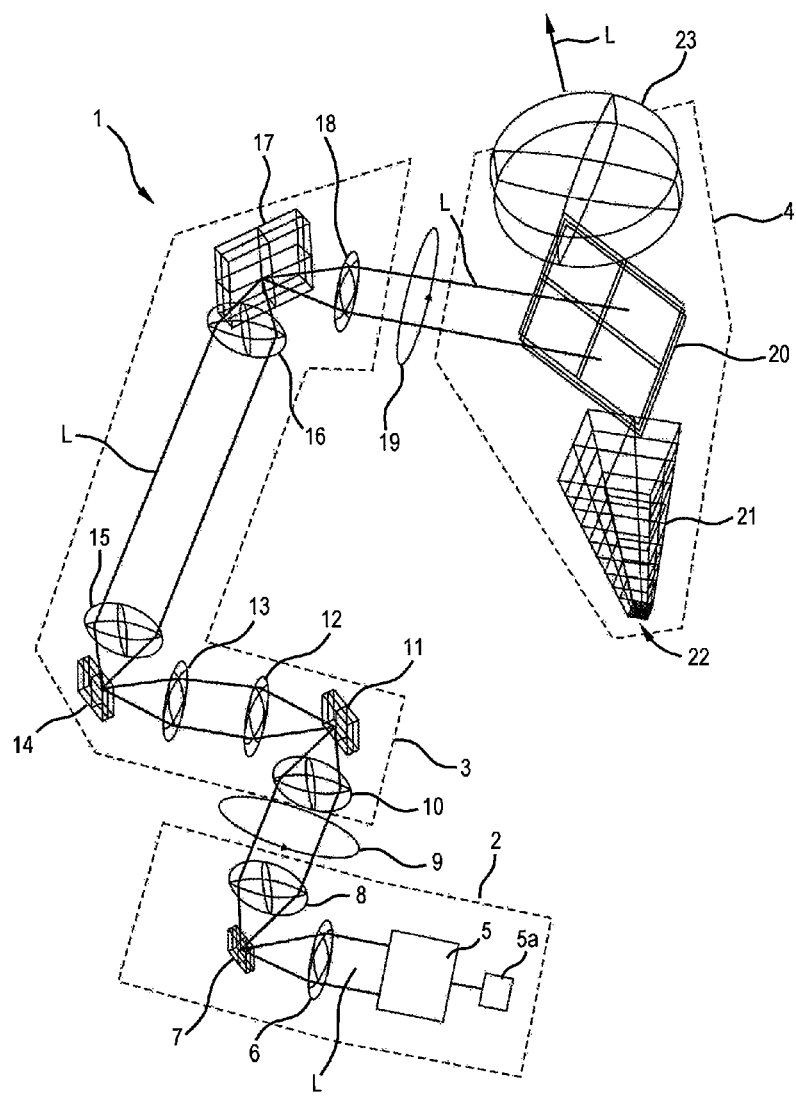
FIG. 1 is a structural sketch of a projection device according to a first embodiment.

FIG. 1 shows, in schematic form, a projection device 1 comprising a base in the form of a (stand) foot 2, a support 3 and a projection head 4. The foot 2 carries the support 3 and the projection head 4. The projection device 1 is therefore supported by means of the foot 2. Arranged within the foot 2 is a light source in the form of a laser 5, for example, a semiconductor laser. The laser 5 is controlled by a control unit 5a, which together form a primary light generating unit 5, 5a. The primary light generating unit can be a prefabricated unit.

The light L emitted by the laser 5 is focused onto a deflection mirror 7 in the foot 2 by means of a lens 6. The deflection mirror 7 directs the light L falling thereon onto a further lens 8 of the foot 2, said lens suitably forming the light beam for emergence from the foot 2 and for entry into the support 3.

The foot 2 and the support 3 are connected to one another via a pivot joint 9 which is rotatable in a first pivot plane (for example, an x-y plane). The pivot joint 9 is configured open, so that a light beam is able to pass from the foot 2 into the support 3 through the pivot joint 9.

In the support 3, the light beam entering or incident through the pivot joint 9 is initially deflected by means of a lens 10 onto a first deflection mirror 11 of the support 3 and from there, is further deflected by a lens 12 and a lens 13 onto a second deflection mirror 14. The second deflection mirror 14, in turn, directs the light incident thereon through two lenses 15 and 16 onto a third deflection mirror 17, the deflection mirror 17 emitting the light L through a further lens 18 out of the support 3.

More precisely expressed, the light L emerges out of the support 3 through a further pivot joint 19 into the projection head 4. The pivot joint 19 is also configured as an open pivot joint so that the light beam from the support 3 is able to pass through the pivot joint 19 into the projection head 4. A (second) pivot plane of the pivot joint 19 (for example, a z-plane) is arranged essentially perpendicular to the (first) pivot plane of the pivot joint 9. In other words, the pivot axes of the two pivot joints 9, 19 are also oriented perpendicular to one another. By this means, the projection head 4 can be oriented in essentially all spatial directions.

The (original) light L entering into the projection head 4 from the support 3 impinges at least partially on a dichroic mirror 20 and is thereby deflected through a light guide rod 21 which can be made, for example, of acrylic glass, onto a luminophore 22 or onto a luminophore volume. The luminophore 22 can be applied, in particular, to the lower cover face or the end face of the light guide rod 21, so that a particularly effective coupling-in and coupling-out of light is produced.

The original light impinging upon the luminophore 22 is at least partially absorbed and re-emitted as light of a different wavelength. The re-emitted wavelength-converted light is collimated by the light guide rod 21 and emitted onto the dichroic mirror 20. The light guide rod 21 thus serves, firstly, for beam formation and, secondly, as a collimator.

The wavelength-converted light falling on the dichroic mirror 20 is allowed through and is output from the projection head 4 by means of an output optical system 23 which can comprise, for example, a focusing lens system.

The projection head 4 can, in particular, be configured so as to comprise a plurality of luminophores or luminophore volumes which can wavelength-convert the original light or the already wavelength-converted light. Each of said different luminophores can be associated with a light guide rod. For example, the laser 5 can be a UV laser, the light from which is directed to three different luminophores in the projection head, where the UV light is converted to red, green or blue light. In this case, the associated dichroic mirrors are not transparent for the UV light, but only for the visible light re-emitted from the respective luminophores.

Alternatively, the light generated by the laser 5 can be visible light, for example, blue light. This original light can be converted in the projection head at least partially into a light of another wavelength. In particular, part of the original light radiated out of the support 3 into the projection head 4 can be emitted to the output optical system 23, without previously being directed toward a luminophore. In this way, a mixed light emerges from the output optical system 23 comprising wavelength-converted light and the coupled-out original light.

The luminophore 22 (or plurality of luminophores) can be cooled, specifically actively (for example, by means of a ventilator or a heat pipe) or passively (for example, by means of a connection to a cooling body). By means of the cooling, heating of the luminophore 22 takes place due to Stokes losses caused by the wavelength-conversion, so that a wavelength shift brought about by this heating can also be limited.

Figure 2:
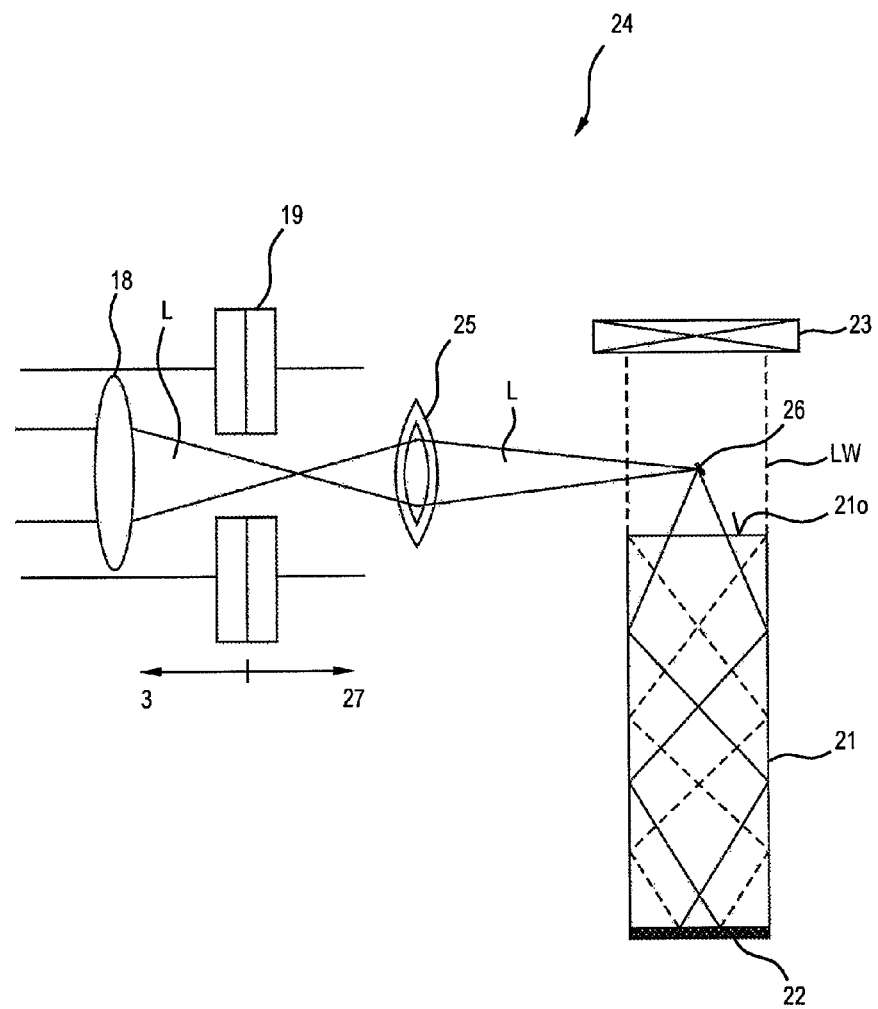
FIG. 2 is an illustration of parts of a projection device according to a second embodiment.

FIG. 2 shows a lateral sectional view of a projection device 24 according to a second embodiment. Said projection device 24 has, in the projection head 27 thereof, in place of the dichroic mirror 20, a micromirror 26 in front of which, seen from the direction of the support 3, a strongly refractive lens 25 is arranged within the projection head 27. The micromirror 26 has a very small area and deflects the original light L, which is strongly focused thereon by the lens 25, through the light guide rod 21 onto the luminophore 22.

The wavelength-converted light created by the luminophore 22 is collimated by the light guide rod 21 and emerges essentially from the whole width of the upper end surface 210. The beam diameter of the wavelength-converted light beam Lw is significantly larger than an area of the micromirror 26 projected in the beam direction. The micromirror 26 therefore does not shade the wavelength-converted light beam Lw significantly. The wavelength-converted light beam Lw can thus pass essentially undimmed through the final optical system 23.

Here also, part of the original light beam L can be coupled out in advance, particularly before entry into the strongly refracting lens 25, in order also to be able to pass through the final optical system 23 and thus to be able to create a suitable mixed light. However, it is also possible, for example, to adjust a density and/or a thickness of the luminophore 22 so that the luminophore 22 wavelength-converts only a defined portion of the original light beam L incident thereon and consequently an already mixed light emerges from the upper end face 210 of the light guide rod 21, comprising a defined proportion of the original light and of the wavelength-converted light. The luminophore 22 can, in particular, be a blue/yellow converting luminophore, whereas the original light beam is a blue light beam. The resulting blue/yellow mixed light can then, in particular, be white light.

The present invention is not restricted to the exemplary embodiments shown. For example, at the end of the light guide rod or the plurality of light guide rods, a linearly or rotationally moving luminophore carrier can be arranged for actively changing the currently irradiated luminophore and thus for changing an overall color location of the light emitted from the projector head 4. In place of the light guide rod (collimator/light mixing rod), a lens of high refractive index can also be used.

Very generally, in place of singular optical elements such as lenses and mirrors, the beam guidance system can at least partially comprise and/or use a light guide body, such as an optical waveguide.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A projection device, comprising a base, a support and a projection head, the support being rotatable relative to the base and relative to the projection head, wherein:
a light guide system is accommodated in the support,
at least one wavelength-converting luminophore for converting at least part of a light beam generated by the at least one light source is accommodated in the projection head, and
the projection head comprises at least one micromirror which directs at least part of the light falling from the support into the projection head onto the at least one wavelength-converting luminophore, the micromirror being arranged in a wavelength-converted light beam radiated back from the associated luminophore.

2. The projection device as claimed in claim 1, at least one primary light generating unit being accommodated in the base.

3. The projection device as claimed in claim 1, the support being rotatable relative to the base in a first plane and relative to the projection head in a plane perpendicular thereto.

4. The projection device as claimed in claim 1, the light guide system comprising at least one mirror in the support.

5. The projection device as claimed in claim 1, the light guide system comprising at least one optical waveguide in the support.

6. The projection device as claimed in claim 1, the projection head comprising at least one dichroic mirror which directs at least part of the light from the support fed into the projection head to the at least one wavelength-converting luminophore, wherein the at least one dichroic mirror is transparent to the light which is wavelength-converted by the luminophore.

7. The projection device as claimed in claim 1, a plurality of wavelength-converting luminophores which convert incident light into light of a respective different wavelength being accommodated in the projection head.

8. The projection device as claimed in claim 7, wherein a plurality of wavelength-converting luminophores is accommodated in the projection head and only wavelength-converted light can be emitted from the projection head.

9. The projection device as claimed in claim 1, a light guide rod being arranged in front of at least one luminophore.

10. The projection device as claimed in claim 9, the at least one luminophore being mounted at an end face of the light guide rod.

11. The projection device as claimed in claim 1, the luminophores being arranged on a rotating disk or on a linearly movable strip.

12. The projection device as claimed in claim 1, the projection device being configured as a room illumination unit, a beamer, a moving-head spotlight, an automobile headlamp or as an operating light.

13. A method for operating a projection device, comprising at least the following steps:
feeding light into a support which is rotatably connected to a base;
conducting the light through the support;
transmitting the light fed into the support to a projection head which is rotatably connected to the support;
conversion, with at least one wavelength-converting luminophore accommodated in the projection head, of at least part of the light transmitted into the projection head into at least one wavelength-converted light;
directing, with at least one micromirror in the projection head, at least part of the light fed from the support into the projection head onto the at least one wavelength-converting luminophore, the at least one micromirror being arranged in a wavelength-converted light beam radiated back from the associated luminophore, and
output of at least the wavelength-converted light from the projection head.

* * * * *